United States Patent
Hasegawa et al.

[11] Patent Number: 6,049,571
[45] Date of Patent: Apr. 11, 2000

[54] ENCODING CIRCUIT WITH A FUNCTION OF ZERO CONTINUOUS-SUPPRESSION IN A DATA TRANSMISSION SYSTEM

[75] Inventors: Hitoshi Hasegawa; Makoto Adachi, both of Yokohama; Makoto Yamada, Kawasaki, all of Japan

[73] Assignee: Fujitsu Limited, Kanagawa, Japan

[21] Appl. No.: 09/208,088

[22] Filed: Dec. 9, 1998

[30] Foreign Application Priority Data

Dec. 26, 1997 [JP] Japan ..................................... 9-359339

[51] Int. Cl.[7] ............................. H04L 25/34; H04L 25/49
[52] U.S. Cl. ........................................... 375/292; 375/289
[58] Field of Search ..................................... 375/286, 289, 375/257, 256, 295, 259, 292; 341/58, 56, 57

[56] References Cited

U.S. PATENT DOCUMENTS

| | | | |
|---|---|---|---|
| 3,963,869 | 6/1976 | Caldwell | 370/505 |
| 4,785,466 | 11/1988 | Lee et al. | 375/286 |
| 5,504,761 | 4/1996 | Shinbashi et al. | 371/57.2 |

*Primary Examiner*—Tesfaldet Bocure
*Attorney, Agent, or Firm*—Helfgott & Karas, PC.

[57] ABSTRACT

An encoding circuit with a function of zero continuous-suppression in a data transmission system according to the present invention includes an EXZ detecting unit, a NRZ pulse generating unit and an output control unit. The EXZ detecting unit receives serial data indicating a NRZ signal and binary information indicating a code rule, and outputs EXZ pulses and delay data. The NRZ pulse generating unit receives the EXZ pulses from the EXZ detecting unit, and outputs an EXZ detecting signal, bipolar rule pulses and violation pulses. The output control unit receives the EXZ detecting signal, the bipolar rule pulses and the violation pulses, these are output from the NRZ pulse generating unit, and the delay data from the EXZ detecting unit, and outputs P-pole pulses and N-pole pulses to an external stage, and an odd signal to the NRZ pulse generating unit.

10 Claims, 6 Drawing Sheets

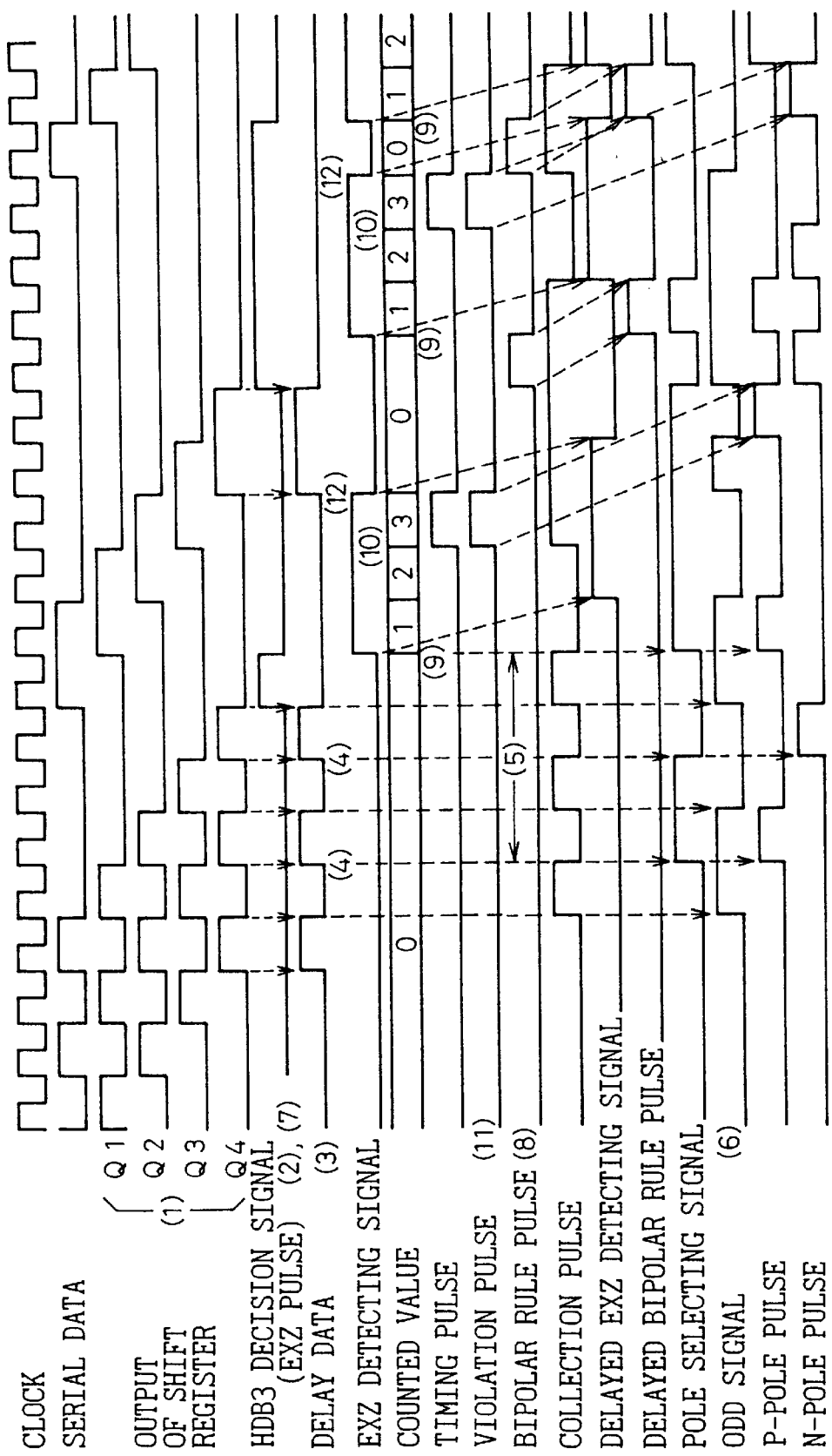

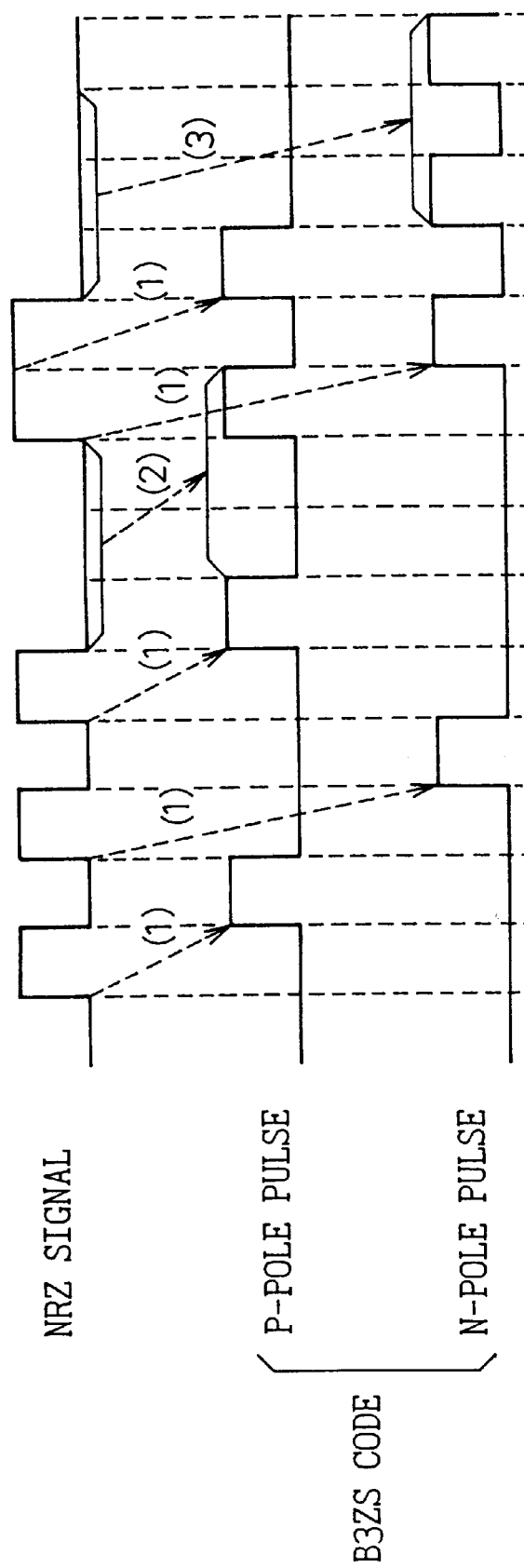

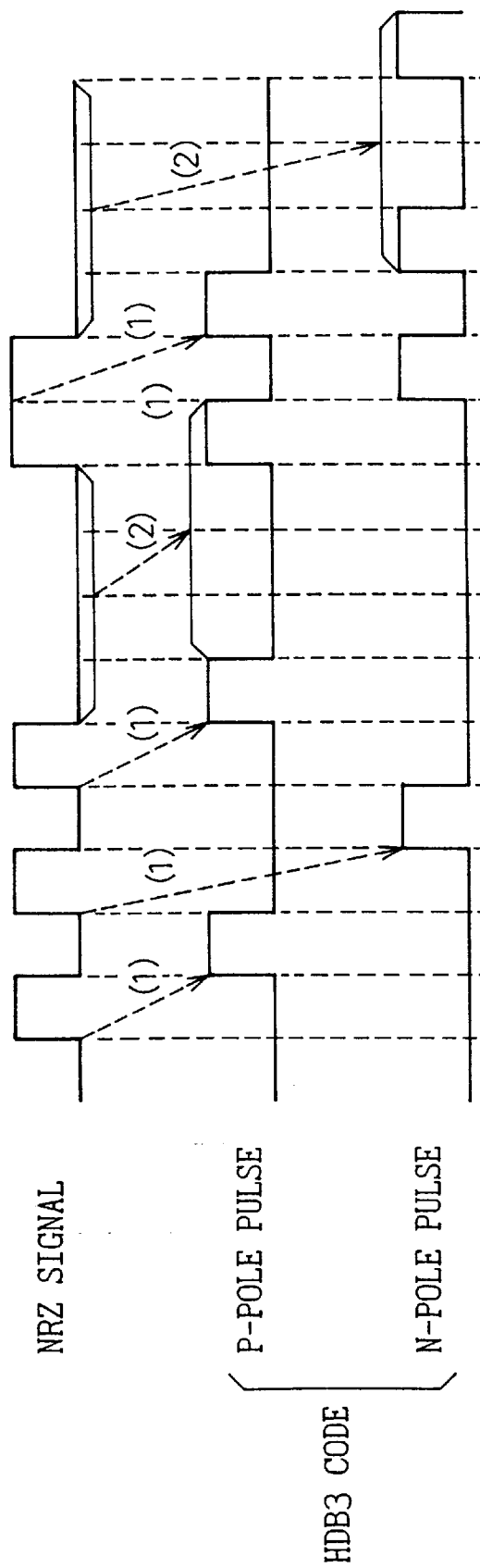

ENCODING CIRCUIT WITH A FUNCTION OF ZERO CONTINUOUS-SUPPRESSION IN A DATA TRANSMISSION SYSTEM

BACKGROUND OF THE INVENTION

1. Field of the Invention

The present invention relates to an encoding circuit with a function of zero continuous-suppression (below, a zero continuous-suppression encoding circuit). Particularly, it relates to a zero continuous-suppression encoding circuit for converting a NRZ (non-return-to-zero) signal to two serial signals corresponding to each pole of a bipolar pulse signal which indicates a desirable zero continuous-suppression code.

2. Description of the Related Art

In a transmission system using a baseband transmission, for example, a SONET (Synchronous Optical Network) or SDH (Synchronous Digital Hierarchy), it is necessary to suppress direct current (DC) components contained in the signals transmitted to the transmission line. When the DC components can be suppressed preferably, it is possible to easily (extract bit synchronous information contained in she signals, and to compress the transmission bandwidth of the signals. As a result, it is possible to quickly detect various faults caused by the transmission line or transmission apparatus at high precision. Accordingly, the above performances are always required in the field of transmission systems.

In order to realize suppression of DC components, a zero continuous-suppression code is applied to the transmission system. The zero continuous-suppression code is used for converting a zero pattern consisting of continuous several bits to particular code pattern, for example, B3ZS (Bipolar With 3 Zeros Substitution) code or HDB3 (High Density Bipolar 3) code.

There are, however, various problems in the zero continuous-suppression encoding circuit when adding this circuit to an LSI circuit as explained in detail below.

SUMMARY OF THE INVENTION

The object of the present invention is to provide an improved zero continuous-suppression encoding circuit which can reduce a size of the circuit and power consumption of the LSI, by finding common points among various code rules and by sharing the circuit in the encoding circuit, and which can be flexibly adapted to all desirable code rules.

In accordance with a first aspect of the present invention, there is provided an encoding circuit with a function of zero continuous-suppression in a data transmission system, including: a variable delay unit for obtaining delay information by applying a predetermined delay to an information having serial bit strings, and the predetermined delay corresponding to the number of bits of continuous block to be replaced based on a predetermined code rule of a zero continuous-suppression code applied, which is contained in a plurality of zero continuous-suppression codes, from an external stage; a continuous block detecting unit adapted to the code rule of the zero continuous-suppression code applied from the external stage, and detecting the continuous block contained in the delay information obtained by the variable delay unit; an anti-bipolar rule term decision unit for determining terms in which violation pulses, which violate a bipolar rule, should be transmitted, in accordance with the code rule of the zero continuous-suppression code applied from the external stage and corresponding to the continuous block detected by the continuous block detecting unit; a bipolar rule term decision unit for determining terms in which bipolar rule pulses, which follow the bipolar rule, should be transmitted, in accordance with the code rule of the zero continuous-suppression code applied from the external stage and corresponding to the continuous block detected by the continuous block detecting means; and an output control unit for distributing the delay information obtained by the variable delay unit based on the bipolar rule, to two poles, transmitting the bipolar rule pulses during the terms determined by the bipolar rule term decision unit, and transmitting the violation pulses during the terms determined by the anti-bipolar rule term decision unit.

In a preferred embodiment, the variable delay unit comprises a delay element which is provided to obtain the delay information, and the continuous block detecting unit detects the continuous block by sharing the delay element provided in the variable delay unit.

In another preferred embodiment, the anti-bipolar rule term decision unit comprises: a plurality of delay unit, each of which obtains a term adapted to an individual code rule by setting a predetermined delay time individually adapted to the code rule of each zero continuous-suppression code to each delay unit, and by applying the predetermined delay time in parallel to the term of the continuous block detected by the continuous block detecting unit; and a term selecting unit for selecting the term corresponding to the code rule of the zero continuous-suppression code applied from the external stage, in the terms obtained by the plural delay unit.

In still another preferred embodiment, the continuous block detecting unit comprises: a plurality of continuous block checking units, each of which detects in parallel the continuous block having the number of bits separately adapted to the code rale of the zero continuous-suppression codes and contained in the delay information obtained by the variable delay unit; and a continuous block selecting unit for selecting the continuous block which corresponds to the code rule of the zero continuous-suppression code applied from the external stage, which is contained in the continuous blocks detected by the plural continuous block checking means.

In still another preferred embodiment, the term selecting unit is formed as a combination circuit using elements which are opened or closed in response to the code rule of the zero continuous-suppression code applied from the external stage.

In still another preferred embodiment, the continuous block selecting unit is formed as a combination circuit using elements which are opened or closed in response to the code rule of the zero continuous-suppression code applied from the external stage.

In accordance with a second aspect of the present invention, there is provided an encoding circuit with a function of zero continuous-suppression in a data transmission system, including: an EXZ detecting unit for receiving serial data indicating a NRZ signal and binary information indicating a code rule, and outputting EXZ pulses and delay data; a NRZ pulse generating unit for receiving the EXZ pulses from the EXZ detecting unit, and outputting an EXZ detecting signal, bipolar rule pulses and violation pulses; and an output control unit for receiving the EXZ detecting signal, the bipolar rule pulses and the violation pulses, these being output from the NRZ pulse generating unit, and the delay data from the EXZ detecting unit; and outputting P-pole pulses and N-pole pulses to an external stage, and an odd signal to the NRZ pulse generating unit.

BRIEF DESCRIPTION OF THE DRAWINGS

In the drawings:

FIG. 4 is a signal timing chart for explaining the HDB3 code rule according to the embodiment of the present invention;

FIG. 5 is a signal timing chart for explaining a code rule of a B3ZS code; and

FIG. 6 is a signal timing chart for explaining the code rule of a HDB3 code.

DESCRIPTION OF THE PREFERRED EMBODIMENTS

Figure 1:
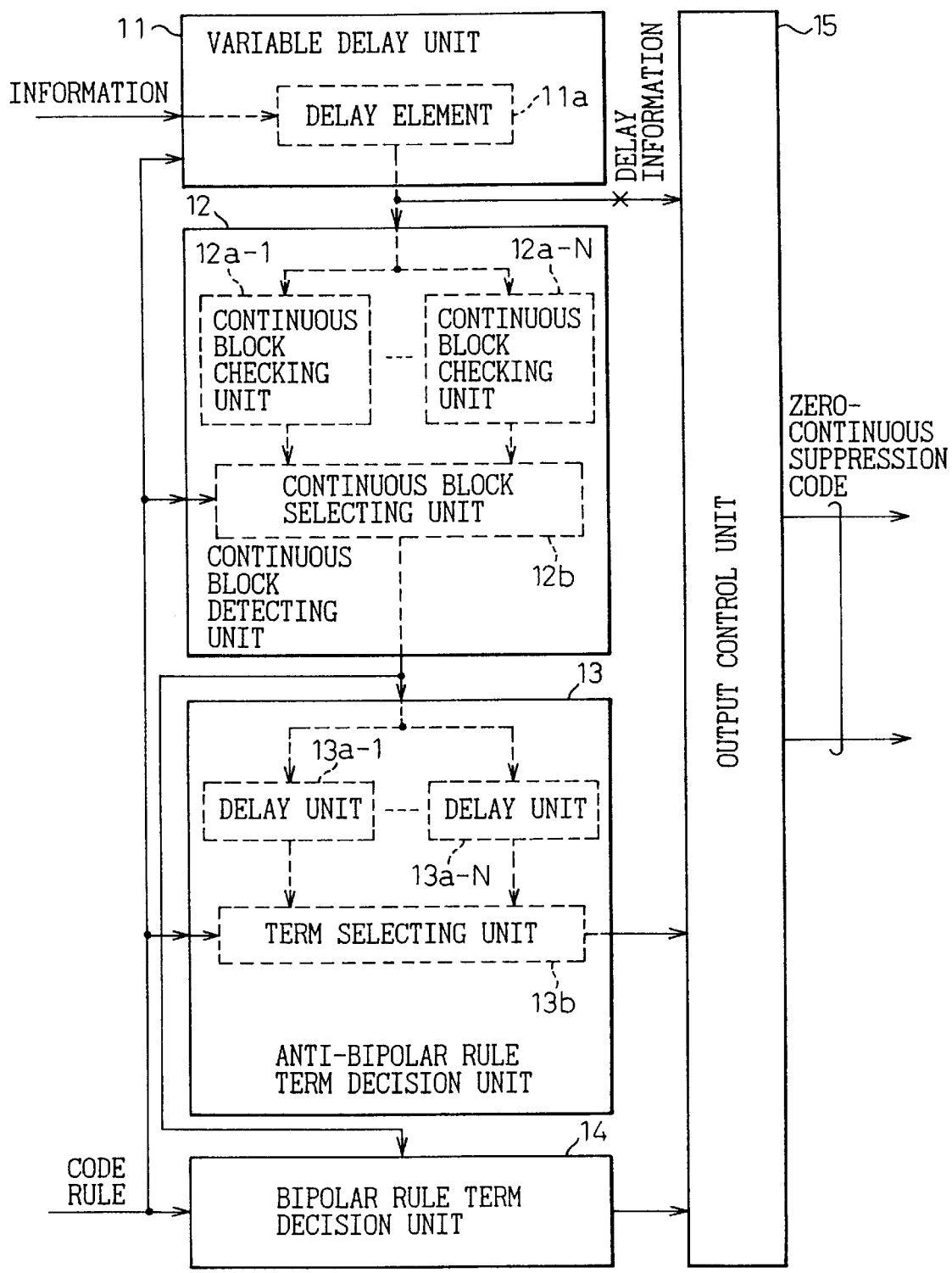
FIG. 1 is a basic block diagram of a zero continuous-suppression encoding circuit according to the present invention.

Before describing preferred embodiments, a conventional art and its problem will be explained in detail with reference to FIGS. 5 and 6 below.

FIG. 5 is a signal timing chart for explaining a code rule of a B3ZS code, and FIG. 6 is a signal timing chart for explaining the code rule of a HDB3 code. As mentioned above, in order to realize suppression of DC components, the zero continuous-suppression code is applied to the transmission system. The zero continuous-suppression code is used for converting a zero pattern consisting of several continuous bits to particular code pattern, for example, B3ZS (Bipolar With 3 Zeros Substitution) code or HDB3 (High Density Bipolar 3) code.

In this case, the B3ZS code is generated based on the following code rule. That is, (A) Bits of logical value "1" contained in the NRZ signal in the form of time series are converted alternately to P-pole pulses and N-pole pulses (see (1) in FIG. 5) as the B3ZS code. That is, the first bit "1" in the NRZ signal is converted to the P-pole pulse, and the second bit "1" is converted to the N-pole pulse. Further, the following bits "1" are converted alternately to the P-pole pulse or the N-pole pulse.

(B) In continuous blocks each consisting of continuous three bits of the logical value "0" in the NRZ signal, when a sum of pulses which are generated preceding to the continuous block are odd, the continuous block is converted to pulses which violate a bipolar rule (i.e., bit string becomes "001" in the form of time series, and the pulses are called "violation pulse" below) (see (2) in FIG. 5). On the other hand, when a sum of pulses which are generated preceding to the continuous block are even, the continuous block is converted to the bit string having bipolar-rule pulse and violation pulse which consist of "101" in the form of time series (see (3) of FIG. 5).

On the other hand, the HDB3 code is generated based on the code rule different from the B3ZS code. That is, a) Bits of the logical value "1" contained in the NRZ signal in the form of time series are converted alternately to P-pole pulses and N-pole pulses (see (1) of FIG. 6) as well as the B3ZS code.

b) In continuous block each consisting of continuous four bits of "0" in the NRZ signal, when a sum of pulses which are generated preceding to the continuous block are odd, the continuous block is converted to the violation pulse which consists of "0001" in the form of time series (see (2) of FIG. 6). On the other hand, when a sum of pulses which are generated preceding to the continuous block are even, the continuous block is converted to the bit string having bipolar-rule pulse and violation pulse which consist of "1001" in the form of time series (see (3) of FIG. 6).

Further, in a transmission apparatus and an exchange which are used in the transmission system, the zero continuous-suppression encoding circuit which performs a BSI (Bit Sequence Independent) process for the NRZ signal of the transmission information based on any code rules mentioned above, is provided to each transmission unit (for example, a line circuit or a trunk) which is interfaced to the transmission path. In this case, the BSI process means conversion of the NRZ signal to either the positive pole (P-pole) or the negative pole (N-pole) based on the predetermined code rule.

In this case, since the B3ZS code and HDB3 code are applied to the SONET and SDH as the standard in the above-mentioned transmission apparatus and exchange (That is, the different code rules are separately applied to the SONET and SDH.), and since the SONET and SDH are employed as the standard main transmission system using the optical fiber in North America and Europe, the different zero continuous-suppression encoding circuits, each of which is adapted to a given area, are separately employed in these areas (i.e., North America or Europe). Accordingly, if the same LSI is to be used for SONET and SDH, it is necessary to provide a particular encoding circuit which can encode for both B3ZS and HDB3 code rules in an interface circuit.

Further, one continuous-suppression encoding circuit adapted to the B3ZS code rule and another adapted to the HDB3 code rule are mounted on the same LSI. Accordingly, the standardization of the system has been realized by suitably providing wiring patterns in an external stage of the LSI. In this case, two zero continuous-suppression encoding circuits (i.e., one is used for the B3ZS code rule and the other is used for the HDB3 code rule) are simultaneously activated in the LSI in actual use.

In this case, however, when the area using the LSI is determined either the continuous-suppression encoding circuit for the B3ZS code rule or the continuous-suppression encoding circuit for the HDB3 code rule is selectively used in accordance with the rule of that area. Accordingly, one of encoding circuits (i.e., B3ZS code rule circuit or HDB3 code rule circuit) is not used in that area although both encoding circuits are simultaneously activated in the LSI.

If any one of encoding circuits is not used, but it is turned on (activated), it is obvious that power for that encoding circuit is wasted and the power consumption of the circuit is increased. Further, unnecessary space must be provided on the LSI in order to mount an unused encoding circuit. Still further, time is required for providing wiring patterns in order to mount the unused encoding circuit and it is necessary to provide many connection parts between the unused encoding circuit and the LSI so that it is very difficult to reduce a size of the circuit. Accordingly, since there are many problems in the above type of the encoding circuit and the LSI, it is very difficult to satisfy low cost and high reliability of the LSI contained in the system.

Accordingly, the present invention aims to provide an improved zero continuous-suppression encoding circuit which can reduce a size of the circuit and power consumption of the LSI by finding common points among various code rules (i.e., B3ZS code rule, HDB3 code rule, B6ZS code rule (not shown), B8ZS code rule (not shown), etc.) and by sharing the circuit in the encoding circuit, and which can be flexibly adapted to all desirable code rules.

FIG. 1 is a basic block diagram of a zero continuous-suppression encoding circuit according to the present invention. In FIG. 1, reference number 11 denotes a variable delay unit, reference number 12 denotes a continuous block detecting unit, reference number 13 denotes an anti-bipolar rule term decision unit, reference number 14 denotes a bipolar rule term decision unit, and reference number 15 denotes an output control unit.

Further, the variable delay unit 11 includes a delay element 11a for receiving information having serial bit-strings and outputting delay information, which are obtained by applying delay corresponding to the number of bits of the continuous block to be replaced based on the code rules of the zero continuous-suppression codes, which are applied from an external stage (see "code rule" in the drawing), to the continuous block detecting unit 12 and the output control unit 15.

Still further, the continuous block detecting unit 12 includes a plurality of continuous block checking circuits 12a-1 to 12a-N each adapted to the code rules applied from the external stage for detecting continuous blocks contained in the delay information, and a continuous block selecting unit 12b for receiving each output of the continuous block checking unit. As is obvious from the drawing, a plurality of continuous block checking units 12a share the delay element 11a of the variable delay unit 11 so that it is possible to reduce the size of the circuit.

Still further, the anti-bipolar rule term decision unit 13 includes a plurality of delay units 13a-1 to 13a-N, each of which separately corresponds to each of zero continuous-suppression codes, and a term selecting unit 13b for receiving each output of the delay unit and determining terms in which the violation pulses should be transmitted (note that the violation pulse is defined as a pulse which violates the bipolar pulse, and "anti-bipolar" is the same meaning as a violated bipolar pulse). According to this structure, since a module structure can be achieved by combining several of the delay units, it is possible to realize flexible packaging design and layout design of the LSI including the encoding circuit.

Still further, the bipolar rule term decision unit 14 receives the output of the continuous block selecting unit 12b and determines the terms in which the violation pulses should be transmitted, based on the bipolar rule in accordance with the code rule applied from the external stage.

Still further, the output control unit 15 receives the delay information from the variable delay unit 11, the output of the term selecting unit 13b and the output of the bipolar rule term decision unit 14; distributes the delay information to two poles (i.e., a P-pole and an N-pole) based on the bipolar rule; transmits the bipolar rule pulses during the terms determined by the bipolar rule term decision unit 14; and transmits the violation pulses during the terms determined by the anti-violation rule term decision unit 13 as the zero continuous suppression codes.

According to the above structures of the present invention, since the units 11 to 15 are structured based on the code rules of the zero continuous-suppression codes, which are applied from the external stage, without overlapped portions each other, and since the zero continuous codes are generated based on the code rules applied from the external stage, it is possible to considerably reduce a size of the encoding circuit and to flexibly adapt to all zero continuous-suppression codes. Further, since the terms in which the violation pulses should be transmitted can be set without passing through an operator, it is possible to provide a common hardware structure regardless of the zero continuous-suppression codes to be adapted.

The following explanations are given to various embodiments of the present invention.

Figure 2:
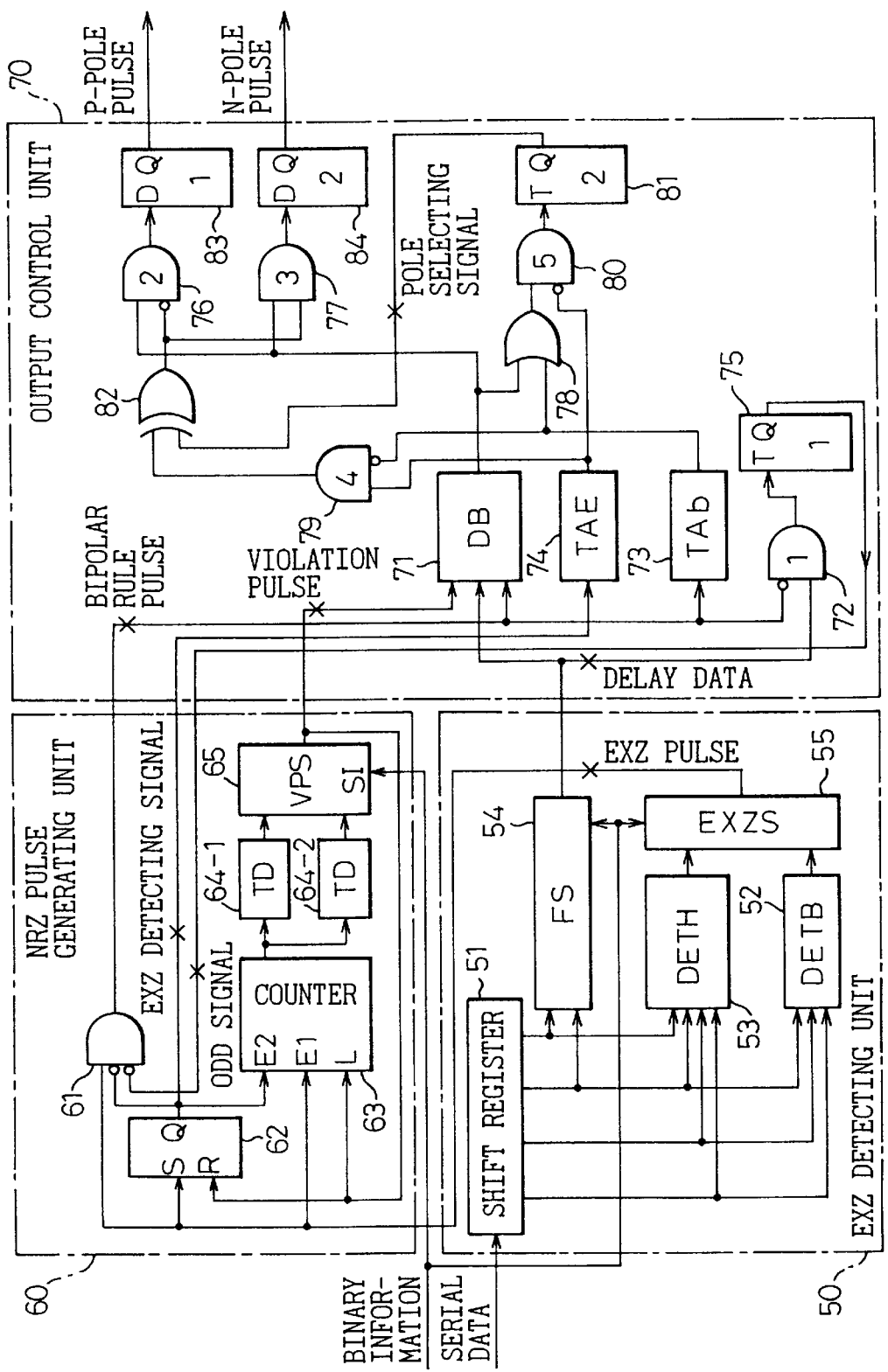
FIG. 2 is a block diagram of a zero continuous-suppression encoding circuit according to an embodiment of the present invention.

FIG. 2 is a block diagram of a zero continuous-suppression encoding circuit according to an embodiment of the present invention. In FIG. 2, reference number 50 denotes an EXZ detecting unit, reference number 60 denotes a NRZ pulse generating unit, and reference number 70 denotes an output control unit.

Briefly, the serial data indicating transmission information and the binary information indicating the code rule, both included in the NRZ signal, are input to the EXZ detecting unit 50. The EXZ detecting unit 50 outputs EXZ pulses to the NRZ pulse generating unit 60, and further outputs delay data to the output control unit 70. The NRZ pulse generating unit 60 outputs the bipolar rule pulses, the EXZ detecting signal and the violation pulses to the output control unit 70. Further, the output control unit 70 outputs and odd signal to the NRZ pulse generating unit 60 and further outputs the P-pole pulse and the N-pole pulse.

In the EXZ detecting unit 50, the serial data is input to a serial input terminal of a shift register 51 which has four output terminals. The first output from the register 51 is input in parallel to a first input terminal of a B3ZS detecting unit (DETB) 52 and a first input terminal of an HDB3 detecting unit (DETH) 53. The second output from the register 51 is input in parallel to a second input terminal of the B3ZS detecting unit (DETB) 52 and a second input terminal of the HDB3 detecting unit (DETH) 53.

Further, the third output from the register 51 is input in parallel to a first input terminal of a final stage selector (FS) 54, a third input terminal of the B3ZS detecting unit (DETB) 52 and a third input terminal of the HDB3 detecting unit (DETH) 53. Still further, the fourth output from the register 51 is input in parallel to the first input terminal of a final stage selector (FS) 54, a fourth input terminal of the B3ZS detecting unit (DETB) 52 and a fourth input terminal of the HDB3 detecting unit (DETH) 53.

Both outputs from the B3ZS (ting unit (DETB) 52 and the HDB3 detecting unit (DETH) 53 are input an EXZ selector (EXZS) 55 so that the EXZ pulses from the EXZ selector (EXZS) 55 are input to the NRZ pulse generating unit 60. Further, the final stage selector (FS) 54 outputs the delay data to the output control unit 70.

In the NRZ pulse generating unit: 60, the EXZ pulses from the EXZ selector 55 are input in parallel to a positive input terminal of an AND gate 61, a set terminal S of a flip-flop circuit 62 and a first enable terminal E1 of a counter 63. The EXZ detecting signal from a non-inverted output terminal (Q of the flip-flop circuit 62 is input in parallel to a first negative input terminal of the AND gate 61, a second enable terminal E2 of the counter 63 and the output control unit 70. Further, the odd signal from the output control unit 70 is input to a second negative terminal of the AND gate 61. An output of the counter 63 is input in parallel to both timing decoders (TD) 64-1 and 64-2.

Both outputs from the timing decoders (TD) 64-1 and 64-2 are input to a violation pulse selector (VSP) 65. Further, the binary signal is input to a selecting input SI of the violation pulse selector 65. The violation pulse selector 65 outputs the violation pulses in parallel to the output control unit 70, a reset terminal R of the flip-flop circuit 62 and a third enable terminal L of the counter 63. Further, the ADD gate 61 outputs the bipolar rule pulses to the output control unit 70.

In the output control unit 70, the violation pulses from the violation pulse selector (VSP) 65 are input to a first input terminal of a data buffer (DB) 71. The delay data from the final stage selector (FS) 54 is input in parallel to a second input terminal of the data base (DB) 71 and a positive input terminal of an AND gate (a first AND gate) 72. Further, the bipolar rule pulses from the AND gate 61 are input in parallel to a third input terminal of the data buffer (DB) 71, a negative input terminal of the first AND gate 72 and an input terminal of a "b0v" timing adjusting unit (TAb) 73. Further, the EXZ detecting signal from the flip-flop circuit 62 is input to an input terminal of an EXZ timing adjusting unit (TAE) 74.

An output terminal of the first AND gate 72 is connected to a trigger input T of a first T-type flip-flop circuit 75, and the odd signal is output from a Q terminal of the first T-type flip-flop circuit 75 to a second negative terminal of the AND gate 61. An output terminal of the data buffer (DB) 71 is connected in parallel to a positive input terminal of a second AND gate 76, one input terminal of a third AND gate 77 and one input terminal of an OR gate 78. An output terminal of the EXZ timing adjusting unit (TAE) 74 is connected in parallel to a positive input terminal of a fourth AND gate 79 and a negative input terminal of a fifth AND gate 80. An output terminal of the "b0v" timing adjusting unit (TAb) 73 is connected in parallel to a negative terminal of the fourth AND gate 79 and the other input terminal of the OR gate 78. Further, an output terminal of the OR gate 78 is connected to a positive terminal of the fifth AND gate 80. In the characters "b0v", "b" represents the bipolar rule pulse, and "v" represents the violation pulse.

An output terminal of the fifth AND gate 80 is connected to one input terminal of an exclusive OR gate 82 through a second T-type flip-flop circuit 81. The other input terminal of the exclusive OR gate 82 is connected to an output terminal of the fourth AND gate 79. An output of the exclusive OR gate 82 is connected in parallel to a negative terminal of the second AND gate 76 and the other input terminal of the third AND gate 77. Further, an output terminal of the second AND gate 76 is connected to an input terminal D of a first D-type flip-flop circuit 83, and an output terminal of the third AND gate 77 is connected to an input terminal D of a second D-type flip-flop circuit 84. Still further, the P-pole pulses are output from a non-inverted output terminal Q of the first D-type flip-flop circuit 83, and the N-pole pulses are output from a non-inverted output terminal Q of the second D-type flip-flop circuit 84.

The relationships in structure between FIG. 1 and FIG. 2 are as follows. That is, the shift register 51 and the final stage selector 54 in FIG. 2 correspond to the variable delay unit 11 in FIG. 1, and the shift register 51 in FIG. 2 corresponds to the delay element 11a in FIG. 1. Further, the B3ZS detecting unit (DETB) 52, the HDB3 detecting unit (DETH) 53 and the EXZ selector (EXZS) 55 in FIG. 2 correspond to the continuous block detecting unit 12 in FIG. 1; The B3ZS detecting unit 52 and the HDB3 detecting unit 53 in FIG. 2 correspond to the continuous block checking units 12a-1 to 12a-N in FIG. 1; and the EXZ selector 55 in FIG. 2 corresponds to the continuous block selecting unit 12b in FIG. 1.

Still further, the flip-flop circuit 62, the counter 63, the timing decoders (TD) 64-1 and 64-2 and the violation pulse selector 65 in FIG. 2 correspond to the anti-bipolar rule term decision unit 13 in FIG. 1; the flip-flop circuit 62, the counter 63, the timing decoders 64-1 and 64-2 in FIG. 2 correspond to the delay units 13a-1 to 13a-N in FIG. 1; and the violation pulse selector (VPS) 65 in FIG. 2 corresponds to the term selecting unit 13b in FIG. 1. Still further, the AND gate 61 in FIG. 2 corresponds to the bipolar rule term decision unit 14 in FIG. 1, and the output control unit 70 in FIG. 2 corresponds to the output control unit 15 in FIG. 1.

Figure 3:
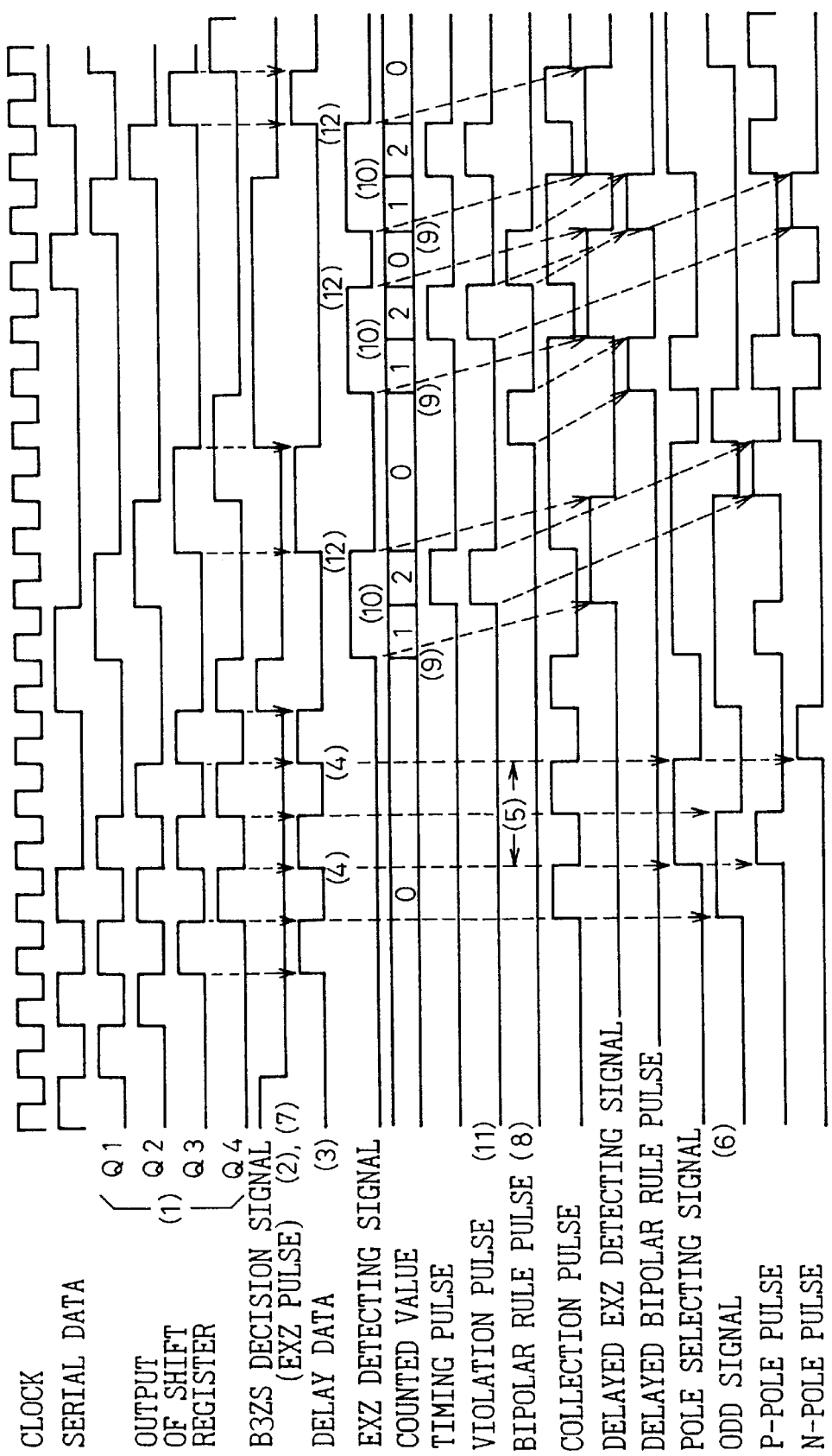
FIG. 3 is a signal timing chart for explaining the B3ZS code rule according to the embodiment of the present invention.

FIG. 3 is a signal timing chart for explaining the B3ZS code rule according to the embodiment of the present invention, and FIG. 4 is a signal timing chart for explaining the HDB3 code rule according to the embodiment of the present invention. The operations of the structure shown in FIG. 2 are explained in detail with reference to FIGS. 2, 3 and 4.

In the EXZ detecting unit 50, the shift register 51 sequentially receives the serial data, and outputs several kinds of serial data each of which is delayed from 1 bit to 4 bits (For example, four kinds of serial data Q1 to Q4 are shown by numeral (1) in FIGS. 3 and 4.). The B3ZS detecting unit (DETB) 52 receives in parallel outputs of the first to third stages of the shift register 51, and decides whether logical values of three bits from the first to third stages are all "0" or not. As a result, the B3ZS detecting unit (DETB) 52 outputs the B3ZS decision signal in the form of the binary signal (see numeral (2) in FIG. 3).

On the other hand, the HDB3 detecting unit (DETH) 53 receives in parallel outputs of the first to fourth stages of the shift register 51, and decides whether logical values of four bits from the first to fourth stages are all "0" or not. As a result, the HDB3 detecting unit (DETH) 53 outputs the HDB3 decision signal in the form of the binary signal (see numeral (2) in FIG. 4).

The EXZ selector (EXZS) 55 receives the binary information from an external stage, and selects the B3ZS decision signal when the logical value of the binary information indicates the B3ZS code rule (see numeral (3) in FIG. 3). On the other hand, the EXZ selector (EXZS) 55 selects the HDB3 decision signal when the logical value of the binary information indicates the HDB3 code rule (see numeral (3) in FIG. 4).

The final stage selector (FS) 54 also receives the binary information from the external stage, and also receives outputs of the third and fourth stages of the shift register 51. Further, the final stage selector (FS) 54 selects the output of the third stage (i.e., an delay data shown by numeral (3) in FIG. 3) when the logical value of the binary information indicates the B3ZS code rule. On the other hand, the final stage selector (FS) 54 selects the output of the fourth stage (i.e., delay data shown by numeral (3) of FIG. 4) when the logical value of the binary information indicates the HDB3 code rule.

Accordingly, the EXZ selector (EXZS) 55 outputs the EXZ pulses (i.e. B3ZS decision signal) which indicate whether the logical values of the newest three or four bits contained in the serial data are all "0" or not. Further, the final stage selector (FS) 54 outputs the logical data of the bits as the delay data representing the serial data which apply the delay time equal to the time required for obtaining the continuous block adapted to the B3ZS decision signal and the HDB3 decision signal.

On the other hand, the flip-flop circuit 62 and counter 63 in the NRZ pulse generating unit 60, and the T-type flip-flop circuits 75 and 81 in the output control unit 70, are initially reset by a reset signal applied from a reset circuit (not shown).

In this situation, in the NRZ pulse generating unit 60, since the counting operation in the counter 63 is restricted, and since the counted value is maintained to the "0", the outputs of the timing decoders 64-1 and 64-2 are set to the logical value "0" which indicates a non-active value, and the violation pulses from the violation pulse selector 65 are set to the logical value "0".

Further, in this situation, the flip-flop circuit 62 is maintained in the reset state, and the logical value of the EXZ detecting signal is maintained to the value "0". Further, as the logical value of the bipolar rule pulse, the logical value "0", which indicates the active value is applied to two negative input terminals of the AND gate 61. However, since the logical value of the EXZ pulse which is applied to the positive input terminal of the AND gate 61, is the value "0" which indicates the non-active value, the logical value of the bipolar rule pulse is set to "0".

In the output control unit 70, the data buffer (DB) 71 receives the violation pulses and the bipolar rule pulses, both having the logical value "0", and the delay data. Further, the data buffer (DB) 71 obtains a logical sum among these signals, and outputs serial pulses (below, collective pulses). The collection pulses in this embodiment are synchronized with front edges or back edges of a clock signal (not shown, however, it is assumed that the clock signal is synchronized with the delay data for each bit in this embodiment.), in order to obtain a "re-timing" operation of the D-type flip-flop circuit.

Further, since the EXZ detecting signal which indicates the logical value "0" is applied to the positive input terminal of the fourth AND gate 79 through the EXZ timing adjusting unit (TAE) 74, the logical value "0" is applied from the fourth AD gate 79 to the exclusive OR gate 82 regardless of the logical value of the bipolar pulses which are applied to the negative input terminal of the fourth AND gate 79 from the "b0v" timing adjusting unit (TAb) 73.

Still further, the fifth AND gate 80 is maintained in an opening state in accordance with the EXZ detecting signal indicating the logical value "0" which is applied from the EXZ timing adjusting unit (TAE) 74 to the negative input terminal of the fifth AND gate 80, it is possible to obtain a pole selecting signal in the output terminal of the second T-type flip-flop circuit 81. The pole selecting signal is inverted at the timing when the delay data applied from the data buffer (DB) 71 through the OR gate 78 is changed from "0"to "1" (see (4) of FIGS. 3 and 4).

Accordingly, the collective pulses, which are input in parallel to the second and third AND gates 76 and 77, and which consist of only the delay data and do not include the components of the bipolar rule pulses and the violation pulses, are alternately applied to the first and second D-type flip-flop circuits 83 and 84 at the timing when the pole electing signal is inverted.

Since the first and second D-type flip-flop circuits 83 and 84 are triggered in response to the clock signal (not shown) which is synchronized with the delay data for each bit, the first and second D-type flip-flop circuits 83 and 84 output the P-pole and N-pole pulses based on the code rule (A) and (a) (see numeral (5) of FIGS. 3 and 4).

In this case, the first T-type flip-flop circuit 75 is initially reset as mentioned above. Further, the first T-type flip-flop circuit 75 is inverted at the timing when the logical value of the delay data, which is not overlapped with the bipolar rule pulse indicated by the code rule (B) and (b), is changed through the first AND gate 72. Accordingly, the first T-type flip-flop circuit 75 outputs an odd signal (see numeral (6) of FIGS. 3 and 4) which indicates whether total numbers of the pulse precedingly generated as the delay data are odd or not.

In the EXZ detecting unit 50, when the binary information indicates the B3ZS code rule, and when the B3ZS detecting unit (DETB) 52 outputs the B3ZS decision signal (see numeral (7) of FIG. 3), the EXZ selector (EXZS) 55 outputs the B3ZS decision signal having the logical value "1" as the EXZ pulses. On the other hand, when the binary information indicates the HDB3 code rule, and when the HDB3 detecting unit (DETH) 53 outputs the HDB3 decision signal (see numeral (7) of FIG. 4), the EXZ selector (EXZS) 55 also outputs the HDB3 decision signal having the logical value "1" as the EXZ pulses.

In the NRZ pulse generating unit 60, the AND gate 61 generates the bipolar rule pulses in accordance with the code rule (B) and (b) at the timing when the logical value of the odd signal is "0" and when the EXZ pulses are generated (see numeral (8) of FIGS. 3 and 4).

Further, since the flip-flop circuit 62 is set at the timing when the logical value of the EXZ pulse becomes "0", the AND gate 61 is set to the closed state so that transmission of the bipolar rule pulses are restricted and the counting operation of the counter 63 is admitted (see numeral (9) of FIGS. 3 and 4).

As mentioned above, the counted values output from the counter 63 during the term when the counting operation is admitted, are decoded by the timing decoders 64-1 and 64-2 so that it is possible to obtain the timing pulses indicating counted values "2" and "3" from outputs of the timing decoders 64-1 and 64-2 (see numeral (10) of FIGS. 3 and 4).

The violation pulse selector (VPS) 65 generates the violation pulses defined by the code rule (B) and (b) (see numeral (11) of FIGS. 3 and 4) by selecting one of timing pulses, i.e., any one corresponding to the binary information indicating the code rule in the timing pulses. The counting operation of the counter 63 is restricted at the timing when the logical value of the violation pulse becomes "1", and the flip-flop circuit 62 is reset. Accordingly, the logical value of the EXZ detecting signal is returned to "0" (see numeral (12) of FIGS. 3 and 4), and the AND gate 61 is returned again to a state in which the bipolar rule pulse can be transmitted.

In the output control unit 70, the "b0v" timing adjusting unit 73 and the EXZ timing adjusting unit 74 make delay one bit to the bipolar rule pulses and the EXZ detecting signal (this delay corresponds to the delay time based on "retiming operation" which is performed by the data buffer 71), and compress slippage on the time base between the bipolar rule pulse/the EXZ detecting signal and the collective pulse signal. In the following explanations, it is assumed that the collective pulses include the bipolar rule pulses and the violation pulses with the component of the delay data.

Further, in the second T-type flip-flop circuit 81, during the term when the EXZ detecting signal applied through the EXZ timing adjusting unit 74 is the logical value "1", the inversion of the second T-type flip-flop circuit 81 is deferred by the fifth AND gate 80 regardless of the logical values of the collective pulses and the bipolar rule pulses.

Accordingly, the bipolar rule pulse takes either P-pole or N-pole, i.e., any one of poles opposite to the pole in which the pulse indicating the component of the delay data was output at just before timing of the bipolar rule pulse.

Further, the fourth AND gate 79 temporarily outputs the logical value opposite to the logical value of the pole selecting signal, which is applied by the second T-type flip-flop circuit 81, to the second and third AND gates 76 and 77 through the exclusive OR gate 82, during the term when the logical value of the EXZ detecting signal applied through the EXZ timing adjusting unit 74 is "1" and when the logical value of the bipolar rule pulse applied through the "b0v" timing adjusting unit 73 is "0". That is, in this case, only when the bipolar rule pulse is "0", is the output of the T-type flip-flop circuit obtained.

Accordingly, the violation pulse( takes either P-pole or N-pole, i.e., the same pole as the pole of the bipolar rule pulse which was precedingly output.

According to the embodiment of the present invention, under combination of the following circuits; i.e., the B3ZS detecting unit (DETH) 52 and the timing decoder (TD) 64-1 both adapted to the B3ZS code rule; the HDB3 detecting unit (DETH) 53 and the (timing decoder (TD) 64-2 both adapted to the HDB3 code rule; the EXZ selector (EXZS) 55, the final stage selector (FS) 54 and the violation pulse selector (VSP) 65 which perform a selecting operation in accordance with the code rule to be adopted; and the output control unit 70 which is applied in common to both code rules, it is possible to realize the BSI of the serial data in accordance with the desired code rule.

Accordingly, compared to the conventional art (i.e., all zero continuous suppression circuits, which are provided corresponding to plural code rules to be adapted, are mounted on the chip), it is possible to improve power consumption and reliability of the chip product so that it is possible to realize standardization of parts adapted to users and to reduce manufacturing cost.

Further, in this embodiment, although the claimed inventions are applied in order to realize the zero continuous-suppression encoding circuit which can correspond to both the B3ZS code rule and the HDB3 code rule, if the continuous block having the number of bits adapted to the code rule is detected, and if a set of the bipolar rule pulse and the violation pulse instead of the detected block is a set of the zero continuous-suppression codes to be transmitted, the present invention can be applied to any type of the zero continuous-suppression code and more than three zero continuous-suppression codes.

Still further, in this embodiment, although the shift register 51 is shared in use in order to detect the continuous blocks and the delay data, if the increase of the hardware size is acceptable, it may be possible to provide a plurality of shift registers instead of the shift register 51. In this case, each of shift registers is formed so as to separately correspond to the B3ZS detecting unit 52, the HDB3 detecting unit 53 and the final stage selector 54.

Still further, in this embodiment, although there are the timing decoders 64-1 and 64-2 each of which separately corresponds to the B3ZS code rule and the HDB3 code rule, and the violation pulse selector 65 for selecting either the timing decoder 64-1 or the decoder 64-2 based on the code rule, it is not restricted to the above structure. That is, if it is not required to provide the module structure corresponding to each code rule and the design using a building block method based on the module structure, it may be not necessary to provide the violation pulse selector 65, and it may be possible to provide a single decoder, which can switch the logic of the decode based on the code rule, instead of the timing decoders 64-1 and 64-2.

Still further, in this embodiment, although there are the B3ZS detecting unit 52, the HDB3 detecting unit 53 and the EXZ selector 55 for selecting either the B3ZS detecting unit 52 or the HDB3 detecting unit 53 based on the code rule, if it is not required to provide the module structure corresponding to each code rule and the design using a building block method based on the module structure, it may be not necessary to provide the violation pulse selector 65, and it may be possible to provide a single detector, which can switch the logic of the decode based on the code rule, instead of the B3ZS detecting unit 52 and the HDB3 detecting unit 53.

Still further, in this embodiment, although there are the final stage selector 54, the EXZ selector 55 and the violation pulse selector 65 in order to electrically perform the selecting operation based on the logical value of the binary information, if it is not required to perform the selecting operation under control of an information processing apparatus, it may be possible to use parts having mechanical contacts, for example, a dip switch, a short pin, etc., instead of the final stage selector 54, the EXZ selector 55 and the violation pulse selector 65.

Still further, in this embodiment, although the violation pulses and the bipolar rule pulses are temporarily composed by the data buffer 71 with the delay data, and P-pole pulse and N-pole pulse are output through the second and third AND gates 76 and 77 which are opened or closed in accordance with the hysteresis of the logical value of the delay data and the logical value of the EXZ detecting signal, it may be possible to provide a selector, which can separately corresponds to the delay data, the violation pulses and the bipolar rule pulses, instead of the data buffer 71; the "b0v" timing adjusting unit 73; the EXZ timing adjusting unit 74; the second T-type flip-flop circuit 81; the OR gate 78; the second, third, fourth and fifth AND gates 76, 77, 79 and 80; and the exclusive OR gate 82.

Still further, in this embodiment, although the output control unit 70 has the same structure and is shared for the code rule since the pole of the violation pulse is the same for both B3ZS code rule and HDB3 code rule, it may be possible to switch if the pole is different in accordance with the code rule to be applied.

We claim:

1. An encoding circuit with a function of zero continuous-suppression in a data transmission system, comprising:

a variable delay means for obtaining delay information by applying a predetermined delay to an information having serial bit strings, and the predetermined delay corresponding to the number of bits of continuous block to be replaced based on a predetermined code rule of a zero continuous-suppression code applied, which is contained in a plurality of zero continuous-suppression codes, from an external stage;

a continuous block detecting means adapted to the code rule of the zero continuous-suppression code applied from the external stage, and detecting the continuous block contained in the delay information obtained by the variable delay means;

an anti-bipolar rule term decision means for determining terms in which violation pulses, which violate a bipolar rule, should be transmitted, in accordance with the code rule of the zero continuous-suppression code applied from the external stage and corresponding to the continuous block detected by the continuous block detecting means;

a bipolar rule term decision means for determining terms in which bipolar rule pulses, which follows the bipolar rule, should be transmitted, in accordance with the code rule of the zero continuous-suppression code applied from the external stage an corresponding to the continuous block detected by the continuous block detecting means; and an output control means for distributing the delay information obtained by the variable delay means based on the bipolar rule, to two poles, transmitting the bipolar rule pulses during the terms determined by the bipolar rule term decision means, and transmitting the violation pulses during the terms determined by the anti-bipolar rule term decision means.

2. An encoding circuit with a function of zero continuous-suppression as claimed in claim 1, wherein the variable delay means comprises a delay element which is provided to obtain the delay information, and the continuous block detecting means detects the continuous block by sharing the delay element provided in the variable delay means.

3. An encoding circuit with a function of zero continuous-suppression as claimed in claim 1, wherein the anti-bipolar rule term decision means comprises: a plurality of delay means, each of which obtains a term adapted to an individual code rule, by setting a predetermined delay time individually adapted to the code rule of each zero continuous-suppression code to each delay means, and by applying the predetermined delay time in parallel to the term of the continuous block detected by the continuous block detecting means; and a term selecting means for selecting the term corresponding to the code rule of the zero continuous-suppression code applied from the external stage, in the terms obtained by the plural delay means.

4. An encoding circuit with a function of zero continuous-suppression as claimed in claim 2, wherein the continuous block detecting means comprises: a plurality of continuous block checking means, each of which detects in parallel the continuous block having the number of bits separately adapted to the code rule of the zero continuous-suppression codes and contained in the delay information obtained by the variable delay means; and a continuous block selecting means for selecting the continuous block which corresponds to the code rule of the zero continuous-suppression code applied from the external stage, which is contained in the continuous blocks detected by the plural continuous block checking means.

5. An encoding circuit with a function of zero continuous-suppression as claimed in claim 3, wherein the term selecting means is formed as a combination circuit using elements which are opened or closed in response to the code rule of the zero continuous-suppression code applied from the external stage.

6. An encoding circuit with a function of zero continuous-suppression as claimed in claim 4, wherein the continuous block selecting means is formed as a combination circuit using elements which are opened or closed in response to the code rule of the zero continuous-suppression code applied from the external stage.

7. An encoding circuit with a function of zero continuous-suppression in a data transmission system, comprising:

an EXZ detecting unit for receiving serial data indicating a NRZ signal and binary information indicating a code rule, and outputting EXZ pulses and delay data;

a NRZ pulse generating unit for receiving the EXZ pulses from the EXZ detecting unit, and outputting an EXZ detecting signal, bipolar rule pulses and violation pulses; and an output control unit for receiving the EXZ detecting signal, the bipolar rule pulses and the violation pulses, these being output from the NRZ pulse generating unit, and the delay data from the EXZ detecting unit; and outputting P-pole pulses and N-pole pulses to an external stage, and an odd signal to the NRZ pulse generating unit.

8. An encoding circuit with a function of zero continuous-suppression as claimed in claim 7, wherein the EXZ detecting unit comprises, a shift register, a B3ZS detecting unit, an HDB3 detecting unit, an EXZ selector, and a final stage selector;

the shift register having four stages, i.e., a first, second, third and fourth stages in order to receive and delay the serial data, and for outputting a delayed bit from each of four stages;

the B3ZS detecting unit for receiving three outputs in parallel from the first, second and third stages of the shift register, detecting whether all bits from the three stages are "0" or not, and outputting an B3ZS decision signal indicated by the binary code;

the HDB3 detecting unit for receiving four outputs in parallel from the first, second, third and fourth stages of the shift register, detecting whether all bits from the four stages are "0" or not, and outputting a HDB3 decision signal indicated by the binary code;

the EXZ selector for receiving the B3ZS decision signal and the HDB3 decision signal, selecting the B3ZS decision signal when the binary information indicates the code rule of the B3ZS code, selecting the HDB3 decision signal when the binary information indicates the code rule of the HDB3 (ode, and outputting either the B3ZS decision signal or the HDB3 decision signal as EXZ pulses; and the final stage selector for receiving two outputs in parallel from the third and fourth stages, selecting the output from the third stage when the binary information indicates the code rule of the B3ZS code, selecting the output from the fourth stage when the binary information indicates the code rule of the HDB3 code, and outputting either the output from the third stage or the output from the fourth stage as delay data.

9. An encoding circuit with a function of zero continuous-suppression as claimed in claim 7, wherein the NRZ pulse generating unit comprises, an AND gate, a flip-flop circuit, a counter, a first and second timing decoders and a violation pulse selector;

the AND gate having one positive input terminal and two negative terminals, the positive input terminal receiving the EXZ pulses from the EXZ detecting unit, one negative terminal receiving the EXZ detecting signal from the flip-flop circuit, and the other negative terminal receiving an odd signal from the output control unit; and outputting the bipolar rule pulses;

the flip-flop circuit for receiving the EXZ pulses in a set terminal thereof and the violation pulses from the violation pulse selector in a reset terminal thereof; and outputting the EXZ detecting signal;

the counter for receiving the EXZ pulses in a first input terminal, the EXZ detecting signal in a second input terminal and the violation pulses in a third input terminal; and outputting counted values;

the first and second timing decoders for receiving and decoding the counted values from the counted values, and outputting timing pulses; and the violation pulse selector for receiving the binary information and the timing pulses from the timing decoders, selecting any one of timing signals based on the binary information, and outputting the violation pulses.

10. An encoding circuit with a function of zero continuous-suppression as claimed in claim 7, wherein the output control unit comprises, a data buffer; an EXZ timing adjusting unit; a "b0v" timing adjusting unit; a first, second, third, fourth and fifth AND gates; a first and second T-type flip-flop circuits; a first and second D-type flip-flop circuits; an OR gate; and an exclusive OR gate;

the data buffer for receiving the violation pulses and the bipolar rule pulses from the NRZ pulse generating unit, and the delay data from the EXZ detecting unit; and outputting a collection pulse signal based on a logical sum of these inputs;

the EXZ timing adjusting unit for receiving the EXZ detecting signal from the NRZ pulse generating unit, and outputting a timing adjusted signal;

the "b0v" timing adjusting unit for receiving the bipolar rule pulses from the NRZ pulse generating unit, and outputting an timing adjusted signal;

the first AND gate for receiving the bipolar rule pulse from the NRZ pulse generating unit in a negative input terminal, and the delay data from the EXZ detecting unit in a positive input terminal; and outputting the logical sum;

the second and third AND gates for receiving the collection pulse signal from the data buffer in each positive input terminal;

the fourth AND gate for receiving the timing adjusted signal from the EXZ timing adjusting unit in a positive input terminal, and the timing adjusted signal from the "b0v" timing adjusting unit;

the fifth AND gate receiving the timing adjusted signal from the EXZ timing adjusting unit in a negative input terminal;

the first T-type flip-flop circuit for receiving the logical sum from the first AND gate, and outputting an odd signal to the NRZ pulse generating unit;

the second T-type flip-flop circuit for receiving a logical sum from the fifth AND gate, and outputting a pole selecting signal;

the first D-type flip-flop circuit for receiving a logical sum of the second AND gate, and outputting P-pole pulses;

the second D-type flip-flop circuit for receiving a logical sum of the third AND gate, and outputting N-pole pulses;

the OR gate for receiving the collection pulse signal from the data buffer; and the exclusive OR gate for receiving the pole selecting signal from the second T-type flip-flop circuit and a logical sum from the fourth AND gate.

* * * * *